March 1, 1938.  A. S. FITZ GERALD  2,110,015
ELECTRIC TIMING AND COUNTING DEVICE
Filed March 9, 1932  3 Sheets-Sheet 1

Inventor:
Alan S. FitzGerald,
by Charles V. Tullar
His Attorney.

March 1, 1938.   A. S. FITZ GERALD   2,110,015
ELECTRIC TIMING AND COUNTING DEVICE
Filed March 9, 1932         3 Sheets-Sheet 2
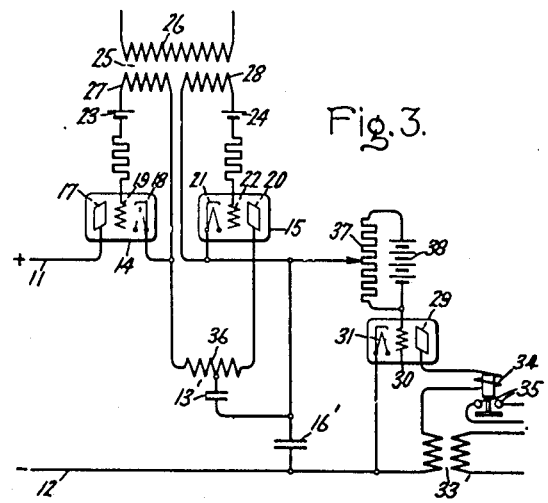
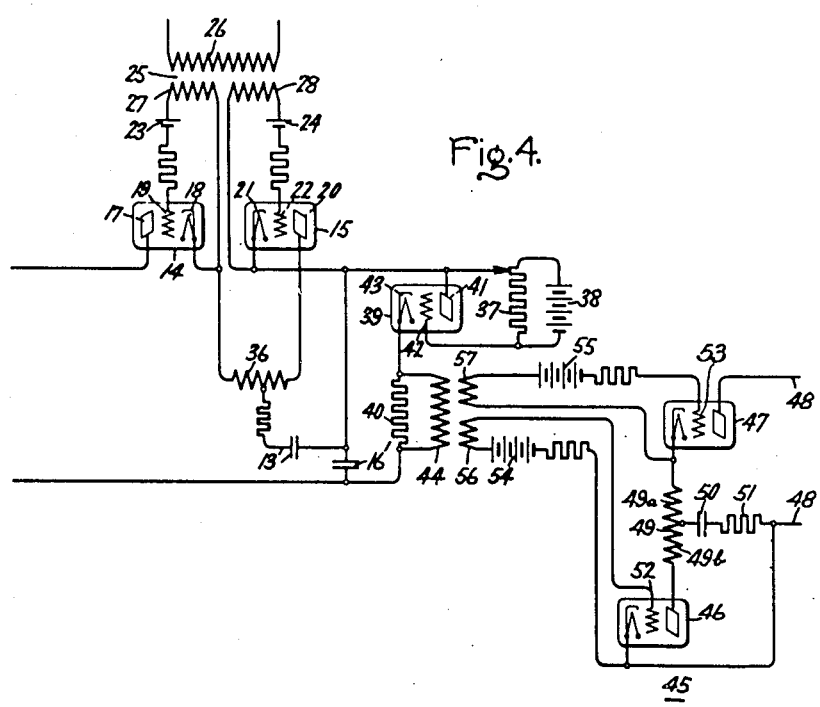
Inventor:
Alan S. FitzGerald,
by Charles V. Tullar
His Attorney.

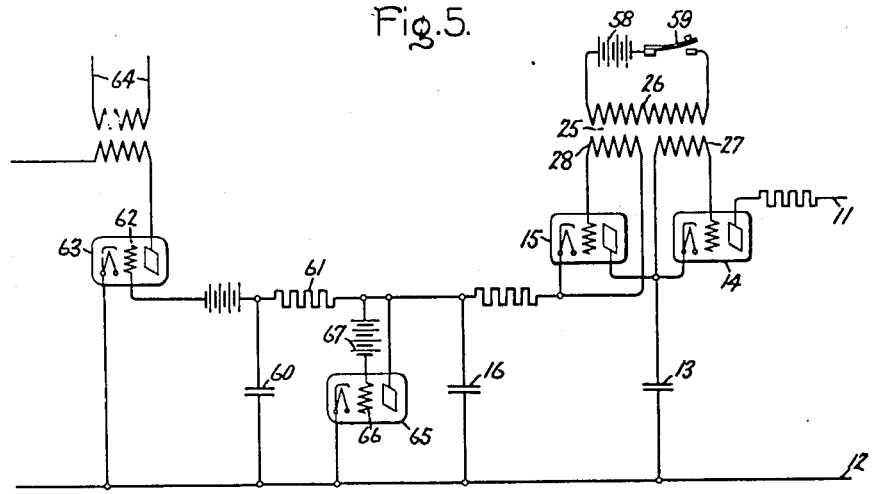
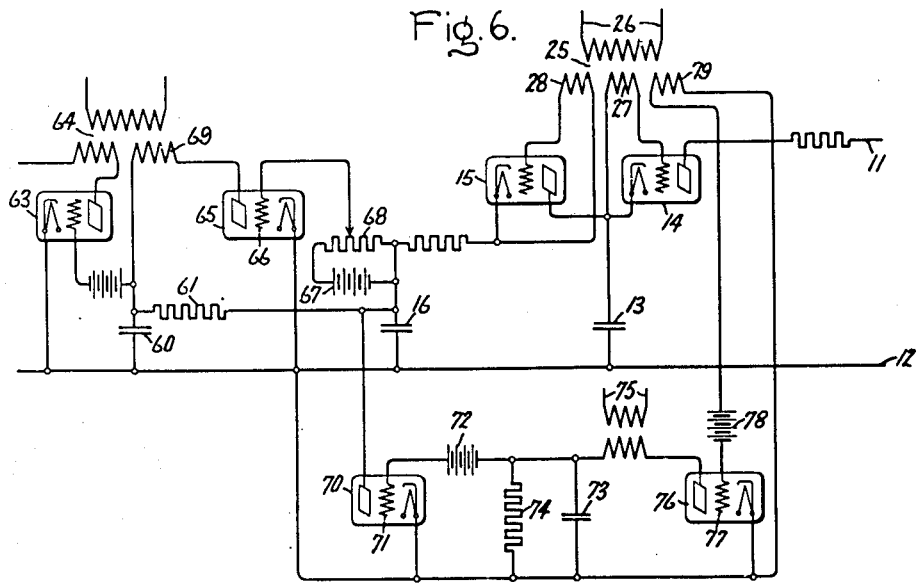
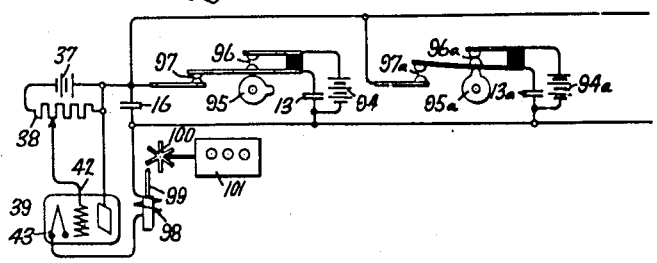
Inventor:
Alan S. FitzGerald,
by *Chas V. Tullar*
His Attorney.

Patented Mar. 1, 1938

2,110,015

UNITED STATES PATENT OFFICE 2,110,015

ELECTRIC TIMING AND COUNTING DEVICE

Alan S. Fitz Gerald, Wynnewood, Pa., assignor to General Electric Company, a corporation of New York Application March 9, 1932, Serial No. 597,855

14 Claims. (Cl. 177—353)

My invention relates to electric timing and counting devices and concerns particularly the employment of electrical means including discharge tubes as counting or timing elements. It is an object of my invention to provide apparatus for measuring time and time differences or for controlling the timing of operations.

Another object of my invention is to provide apparatus for counting impulses or for affecting the operation of an apparatus after the operation has been repeated a predetermined number of times.

Another object of my invention is to provide a frequency converter or frequency divider for use with alternating current circuits and particularly for use where the ratio of conversion is large. This aspect of my invention is claimed in my divisional application, S. N. 679,893 filed July 11, 1933, Patent No. 2,078,792 dated April 27, 1937. Other and further objects will become apparent as the description proceeds.

In accordance with my invention in its preferred form a plurality of condensers and current controlling devices, for example electric discharge tubes are so connected in relation to a source of current that one of the condensers is alternately charged and discharged, and charges are transferred to one or more other condensers in such a manner that the potential acquired by the latter condensers is an indication of the number of impulses supplied to the apparatus.

Depending on the purpose for which the apparatus is employed, the operation of the current controlling devices may be effected by individual impulses to be counted or by reversals in polarity of an alternating current circuit. Means responsive to voltage are provided to give an indication or to initiate the operation of other apparatus when a charge of a predetermined magnitude has been transferred to and stored by one of the charge collecting condensers. The features of my invention which I believe to be novel and patentable will be pointed out in the claims appended hereto.

Figure 1:
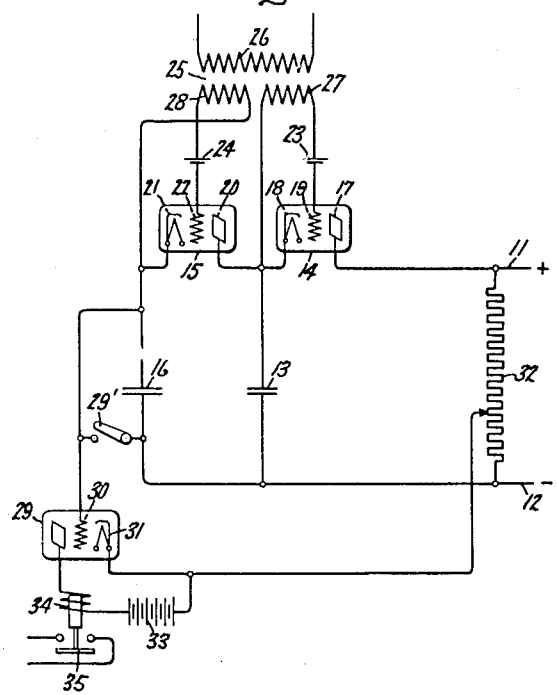
Figure 2:
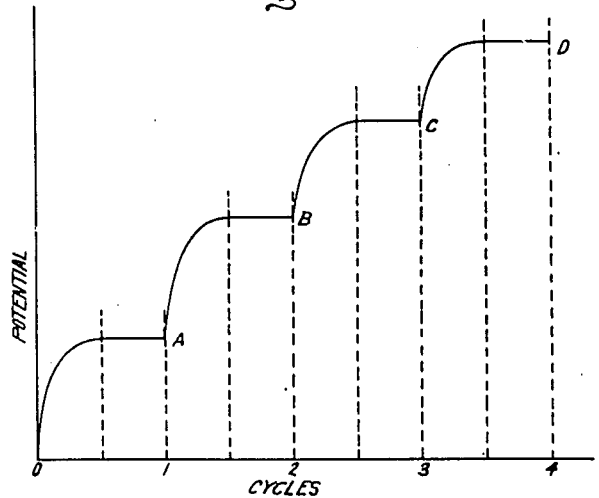

My invention itself, however, will be best understood by referring to the following description taken in connection with the accompanying drawings in which Fig. 1 represents schematically one form of counting or timing device which may also be used as the basis for frequency converting apparatus, may be arranged as a code selector, or used in connection with other apparatus; Fig. 2 is a curve explaining the action of the apparatus; Fig. 3 is a modified form of the apparatus shown in Fig. 1; Fig. 4 is a frequency dividing arrangement; Fig. 5 a relatively simple form of code selector; Fig. 6 represents a code selector in which special precautions are taken to prevent errors; and Fig. 7 represents a totalizing device in which mechanical circuit interrupters are utilized.

Referring now more in detail to the drawings in which like reference characters refer to like parts throughout, in the arrangement shown in Fig. 1 a charging current is supplied by a source 10 which may, if desired, be a constant potential direct current source having a positive terminal 11 and a negative terminal 12. A charge transferring condenser 13 is connected to the source of current through a current controlling device, 15 preferably a grid controlled discharge tube 14. A second current controlling device, preferably also a grid controlled discharge tube 15 and a charge collecting condenser 16 are connected in series across the terminals of the charge transferring condenser 13. Although I have shown a source of direct current for charging the condenser 13, my invention is obviously not limited thereto as an alternating current source can also be employed when a discharge tube or other inherently rectifying means is utilized as the current controlling means 14.

The tube 14 has its plate 17 connected to the positive terminal 11 of the direct current source and its cathode 18 connected to a terminal of the condenser 13. The passage of current through the tube 14 is controlled by the potential of the grid 19. Similarly, the tube 15 is provided with a plate 20 connected to cathode 18 of tube 14, a cathode 21 connected to one terminal of charge collecting condenser 16, and a control grid 22. The control grids 19 and 22 are normally biased to a potential below that of the corresponding cathodes 18 and 21 by means of suitable sources of voltage such as cells 23 and 24.

The potentials of the grids 19 and 22 are controlled by means of a transformer 25 having a primary winding 26 and oppositely connected secondary windings 27 and 28. The primary winding 26 may either be connected to a source of alternating current causing the potentials of the grids 19 and 22 to vary oppositely in regularly recurring cycles or it may be arranged to be connected to and disconnected from a source of direct current in order to vary oppositely the potentials of grids 19 and 22 in response to a given impulse signal, operation of a machine or other event depending upon the application in which the apparatus is to be employed.

Any suitable means responsive to the voltage across condenser 16 may be employed to give a response after a predetermined number of impulses have been given to the apparatus, after a current has flowed through winding 26 for a predetermined number of cycles or after a predetermined time has elapsed. This voltage responsive means may take the form, for example, of a discharge tube 29 having a control grid 30 connected to one side of the condenser 16. The cathode 31 of the discharge tube 29 is given the desired potential by connecting it to a point on the potentiometer 32 which is connected between terminals 11 and 12 of the direct current source. When there is no charge on the condenser 16 and the potential difference between its plates is zero the grid 30 will be at the same potential as the terminal 12 of the direct current source, which will be negative with respect to the cathode 31. Accordingly, the tube 29 will be non-conducting in accordance with well known characteristics of such tubes. After a predetermined charge has been acquired by charge collecting condenser 16 the potential of the grid 30 will rise to the point where its potential with respect to the cathode 31 will be such as to cause the tube 29 to become conducting thereby permitting a source of current, for example, the battery 33 to cause a current to flow through a current responsive device 34, closing the contacts 35 arranged to cause the performance of any desired operation. Although I have shown a contact making device controlled by a discharge tube, it will be understood that my invention is not limited to this arrangement.

If desired, means may be employed for restoring the apparatus to the initial conditions after an operation. For example, a switch 29' controlled manually, by other apparatus or by the device 34, may be utilized to short-circuit the condenser 16 after the operation of device 34, thereby restoring it to zero potential. Other means for discharging condenser 16 will be described in connection with modified apparatus, and still other means will readily suggest themselves to those skilled in the art. However, it will be understood that I am not limited to the use of any specific means for dissipating the charge in condenser 16.

As the polarities of the voltages produced by windings 27 and 28 reverse, the potentials of the grids 19 and 22 will vary alternately from potentials negative with respect to the cathodes 18 and 21 respectively to potentials positive with respect to the cathodes, thereby causing the tubes 14 and 15 to become alternately conducting and non-conducting. Since the windings 27 and 28 are oppositely connected tube 14 will be conducting when tube 15 is non-conducting and vice versa. Tubes 14 and 15 may be of any suitable type employing control grids including either the vacuum or vapor arc types. In either case the passage of current is controlled by the potential of the grids. Although I prefer to utilize grid controlled discharge tubes, my invention is not limited thereto but obviously includes the use of any suitable type of current controlling means.

Fig. 2 illustrates the action in case tubes of the vapor arc or ionic discharge type are employed in which case each tube will conduct during one-half cycle and be non-conducting during the other half of the cycle of an alternating current source supplying winding 26, and the tube will change abruptly from non-conducting to the conducting condition as the grid becomes positive with respect to the cathode for the reason that conductivity results from ionization of the medium within the tube and such ionization is controlled by the grid potential. During one-half cycle current will flow into the condenser 13 charging it to the potential existing between terminals 11 and 12. During the next half cycle tube 14 will be non-conducting, tube 15 will become conducting and the charge will be transferred from condenser 13 to condenser 16. If the condenser 16 has a greater capacity than condenser 13, a number of charges may be transferred from condenser 13 to condenser 16 before the potential of condenser 16 begins to approach that of the direct current source 11—12. In Fig. 2 the potential of condenser 16 is plotted against time measured in cycles of an alternating current source supplying winding 26. Referring to Fig. 2, it will be seen that during one half cycle as current is flowing into condenser 16 the potential across condenser 16 gradually rises following an exponential curve. During the next half cycle when tube 15 is non-conducting the potential will remain fixed, resulting in a series of curved and flat portions with steps at the points A, B, C, and D. If the discharge tube 29 is so biased as to become conducting when the potential across condenser 16 equals that represented by the point D on the curve Fig. 2, the apparatus will respond after four cycles of alternating current have flowed in the winding 26 or after four impulses have been given to the apparatus. If the source of alternating current supplied to winding 26 has a constant frequency, obviously the apparatus may be used as a timing device since each cycle represents a fixed period of time. However, the apparatus is also useful in connection with counting impulses which do not occur at fixed intervals since each impulse produces an increase in charge on condenser 16 which remains constant for a considerable period of time and the resultant potentials will be represented by flat portions in curve Fig. 2 of varying length instead of fixed length. Obviously, the apparatus may be arranged to operate after any desired number of impulses or after the expiration of any desired period of time.

In Fig. 3 I have shown another manner of connecting the apparatus shown in Fig. 1. In this case the condensers are connected in series instead of in parallel and are designated by the reference characters 13' and 16'. Condenser 13' has one terminal connected to the mid-point of a resistor 36 which joins cathode 18 of tube 14 to plate 20 of tube 15. Accordingly, a series circuit is formed from positive terminal 11 of the direct current source through tube 14, a portion of resistor 36, charge transferring condenser 13', charge collecting condenser 16', back to negative terminal 12 of the direct current source. When the tube 14 becomes conducting currents will flow, charging condenser 13' and 16'. Initially, the distribution of potential between condensers 13' and 16' will depend upon the relative capacities of the condensers. When tube 15 becomes conducting condenser 13' will be discharged but the charge collected by condenser 16' will be retained. Each time tube 14 becomes conducting and condenser 13' is charged condenser 16' will be raised to a higher potential which is the same result produced by the arrangement shown in Fig. 1.

Means responsive to the potential across the plates of condenser 16' are here shown by way of illustration to comprise a discharge tube 29 having its grid 30 suitably biased to a negative potential by means of a potentiometer 37 connected to a battery 38. In this case the discharge tube 29 is illustrated as controlling an alternating current source 33' instead of a direct current source 33 as shown in Fig. 1.

Either form of the apparatus shown in Figs. 1 and 3 may be employed in any arrangement where it is desired to measure time or count impulses or to control the operation of other apparatus after a predetermined time or after a predetermined number of impulses or after the apparatus itself is operated a predetermined number of times. Either form of the arrangement may also be utilized as the basis of other apparatus requiring timing means or counting means for its operation. It will be apparent that the number of impulses required to give a response is determined by the relative capacities of condensers 13 and 16 or 13' and 16', by the voltage of the source 11—12, and by the grid bias given tube 29.

Fig. 4 represents an arrangement in which an alternating current of one frequency may be converted to another of a lower frequency. After a predetermined number of cycles of one alternating current circuit, an impulse is produced which initiates a cycle in another alternating current circuit. In this arrangement additional apparatus is employed which times the second alternating current circuit in response to the frequency of the first alternating current circuit. After a predetermined number of cycles, the potential of condenser 16' raises the potential of the plate 41 and the grid 42 of a discharge tube 39 to the point where the tube 39 becomes conducting and the condenser 16' is discharged through the tube 39 and the resistor 40.

The momentary flow of current in resistor 40 momentarily creates a potential difference between the ends of the winding 44 of a transformer. After the condenser 16' is discharged the operation of the cycle counting device is repeated until the potential of the condenser 16' again reaches the predetermined value so that it is discharged through resistor 40 and another impulse is produced in winding 44 of the transformer. This operation is repeated indefinitely. An inverter 45 of any suitable type is provided in which each impulse of the winding 44 is arranged to start a flow of current in a suitable circuit in a reverse direction each time, thereby producing alternating currents having a frequency bearing a definite ratio to the frequency of the current flow in winding 26 of transformer 25.

I may, for example, use an inverter of the peak excitation type employing a pair of discharge tubes 46 and 47 preferably of the vapor arc discharge type. The power required by the inverter is supplied by a direct current source 48. The tubes joined by a reactor 49 are connected in series across the terminals of the direct current source 48. A condenser 50 and a load 51 in series form a circuit from the mid-point of reactor 49 to one terminal of the direct current source 48. The tubes 46 and 47 have their grids 52 and 53 normally negatively biased with respect to the cathodes of the tubes by means of batteries 54 and 55 respectively. The batteries 54 and 55 are connected to the secondary windings 56 and 57 which are in inductive relation with the winding 44.

Secondary windings 56 and 57 have voltages induced in them by the momentary flow of current through winding 44 which occurs whenever the condenser 16' is discharged. The windings 56 and 57 are so connected that these momentary voltages raise the potentials of the grids 52 and 53 momentarily above the potentials of the corresponding cathodes thereby making the tubes conducting in response to impulses sent through winding 44 from condenser 16'.

Although the grids 52 and 53 of tubes 46 and 47 become positive simultaneously causing both the tubes to be in a conducting condition at the same time, current actually flows in only one of the tubes at a time. The action is as follows: Assuming that the condenser 50 is initially discharged, when the voltage peaks are impressed on grids 52 and 53, the tubes become conducting momentarily. Owing to the fact that the circuit including the portion 49a of reactor 49, the condenser 50 and load 51 in series with direct current source 48 has a lower inductive reactance as a result of the capacity 50 than the circuit which includes the other portion 49b of the reactor 49, a current will tend to build up in the portion 49a before it does in the portion 49b. Since both portions have a common magnetic circuit, the same back voltage will be induced in each portion. The back voltage induced in 49b will be sufficient to suppress the current which would tend to start flowing in 49b and tube 46.

Owing to the inductive inertia effect on the current flowing in 49a, condenser 50, and load 51, which may be a tuned circuit, current will continue to flow after the condenser 50 has reached the potential of the direct current source 48. Consequently, condenser 50 will reach a potential higher than that of source 48 so that ultimately the current in tube 47 and reactor portion 49a is suppressed regardless of the conducting condition of tube 47. Since the tube 47 can pass current in only one direction, the condenser 50 cannot discharge through tube 47 back into the source 48.

The next time tubes 46 and 47 become conducting, condenser 50 will discharge through the tube 46 causing a reversal of the current flowing in the load 51, but no current tends to flow from source 48 through tube 47 since the condenser 50 is at a higher potential than the source 48. The subsequent time the tubes become conducting current will again flow through tube 47, reactor portion 49a, condenser 50, and load 51, tending to charge the condenser 50 and suppressing as a result of the back voltage any tendency for current flow in tube 46. In this manner the operation continues with the current flowing alternately in tubes 47 and 46 and the direction of current in load 51 being reversed each time the tubes become conducting. Although not essential to the operation it is desirable to choose values of inductance and capacity which provide a tuned circuit in order to obtain a current in load 51 having a sine wave shape. This action is repeated indefinitely and accordingly an alternating current is produced in the load 51 having a frequency which bears a predetermined relationship to the frequency in the source supplying winding 26 of transformer 25. Although I have shown the apparatus in connection with an inverter of the peak excitation type which is well known in the art, it will be understood that my invention is not limited thereto and may be used to control the operation and frequency of any suitable type of inverter.

The basic apparatus disclosed in Figs. 1 and 3 may also be used, for example, to form a portion of an electrical code selector thereby eliminating the necessity for cams or other mechanical parts and permitting the designer greater latitude in the choice of timing of the impulses or the intervals therebetween.

In Fig. 5 I have shown for the sake of illustration a switch or telegraph key 59 closing a circuit through a battery 58 and primary winding 26 of transformer 25. When the switch is closed, voltages are induced in windings 27 and 28. Since the windings 27 and 28 are oppositely connected, the grid potentials of the tubes 14 or 15 are oppositely affected, the grid of one of the tubes becoming positive and causing the tube to conduct. When the switch 59 is opened, voltages of the reversed polarity are induced in windings 27 and 28, and the tube which was conducting ceases to conduct whereas the other tube becomes conducting. The operation is similar to that explained in connection with Fig. 1 so that condenser 13 is alternately charged and discharged as before, and condenser 16 is raised to a successively higher potential with each impulse. Having connected a battery and telegraph key across the primary winding 26, the apparatus of Fig. 1 or 3 without further change might be used as a code responsive device. However, the device would not be fully selective since the response would take place as soon as the required number of impulses had been supplied and the device would therefore respond as well to an incorrect number of impulses greater than the required number. Consequently, the arrangement is modified as shown in Fig. 5 to prevent a response if an additional impulse is supplied.

To this end an additional charge collecting condenser 60 is connected in parallel with the condenser 16 which may now be termed the intermediate condenser. A resistor 61 is interposed in one of the leads connecting condensers 16 and 60 in order that condenser 60 will acquire the potential of condenser 16 only after a time delay depending upon the magnitude of resistance 61. A discharge tube 65 is connected across condenser 16 and has its grid 66 so biased by means of battery 67 that the tube becomes conducting when condenser 16 reaches a potential corresponding to a number of impulses one greater than the correct number for the code for which the apparatus is arranged. In consequence of the time delay introduced by resistor 61, condenser 16 is discharged upon the occurrence of a false signal before condenser 60 has reached the potential corresponding to the number of impulses in the code.

As in the form of the apparatus previously described, when the predetermined number of impulses has been produced by switch 59, causing charge transferring condenser 13 to be charged and discharged a predetermined number of times, the condensers 16 and 60 will acquire a potential which overcomes the negative bias of grid 62 of discharge tube 63 permitting the discharge tube 63 to conduct current supplied by a source 64. Although I have shown a discharge tube 63 and a source of current 64 it will be understood that any suitable means responsive to the potential of charge collecting condenser 60 may be employed to indicate that the required number of impulses has been produced by switch 59.

Although the arrangement shown in Fig. 5 is made unresponsive when an extra impulse is supplied, even this arrangement is not fully selective. Since the extra impulse restores the apparatus to initial conditions, the operation starts over again and a response may be obtained if a certain number of additional impulses is supplied. To prevent this result the discharge tube 65 may be connected, as shown in Fig. 6, across condenser 60 instead of 16, but having its grid 66 connected through potentiometer 68 to the terminal of the condenser 16. Consequently, the tube 65 becomes conducting and discharges condenser 60 as soon as the potential of condenser 16 acquires a value corresponding to one more than the correct number of impulses, and the condenser 60 remains discharged, however great the potential of condenser 16 becomes. If desired, the discharge tube 65 may be provided with an anode supply by means of the secondary winding 69 of the transformer 64, thereby charging the condenser 60 negatively whenever the potential of the condenser 16 exceeds the predetermined value, in order to insure neutralization of charge flowing from condenser 16. The apparatus shown in Figs. 1, 3, and 5, and in Fig. 6, so far as described, may be used to respond to a given number of impulses regardless of the time interval between impulses.

The apparatus may be made still more selective by so arranging it that it will not respond unless the impulses are received consecutively and within intervals of a predetermined normal length. This may be accomplished as shown in Fig. 6 by providing a discharge tube 70 connected in shunt to the intermediate condenser 16. The tube 70 normally short-circuits the condenser 16 since the grid 71 is normally positively biased by means of battery 72. The apparatus is so arranged, however, that whenever an impulse is received by the winding 26 of transformer 25, the positive bias of grid 71 is removed and the tube remains non-conducting until a period slightly greater than the normal interval between the impulses of the code has elapsed. In order to remove the positive bias of the grid 71, condenser 73 connected between the cathode of the tube 70 and the grid battery 72 is arranged to be negatively charged whenever an impulse is received by the transformer 25. After the normal interval has elapsed the charge of the condenser 73 leaks off through resistor 74.

The condenser 73 is charged by means of a source 75 controlled by a discharge tube 76 having a grid 77 normally negatively biased by means of a battery 78. The potential of the grid 77 is controlled by means of a secondary winding 79 forming a portion of the transformer 25 which comprises also the secondary windings 27 and 28 controlling the grids of tubes 14 and 15. It will be apparent that, if there is a pause in the supplying of impulses or if the impulses are discontinued after an unsuccessful or a successful attempt to operate the device, the condenser 16 will be discharged and the apparatus will be restored to its initial condition.

Although I have illustrated the apparatus required to respond to a single figure code only, it will be understood that my invention is not limited thereto but that the apparatus illustrated may be utilized as one of the units of a device responsive to a mode containing two or more groups of impulses.

Although I prefer to utilize discharge tubes or electric valves for controlling the charging and discharging of the charge transferring condenser 13 and the charging of charge collecting condenser 16 in order that the apparatus may be responsive to very high rates of impulses, my invention is not limited to the use of such circuit controlling means. Mechanical circuit interrupters, for example, as shown in Fig. 7, may also be used where a very high rate of impulses is not necessary. Fig. 7 also illustrates the application of my invention to summation or totalizing and telemetering devices. A plurality of charge transferring condensers 13, 13a, etc., having sources of charging current 94, 94a, etc. are arranged to be charged and to give up their charges to a charge collecting condenser 16 in response to impulses to be totalized. Mechanical means, for example rotating cams 95 and 95a are utilized to make and break the charging circuit through contacts 96 and 96a and to close the circuits from the charge transferring condensers 13 and 13a to the charge collecting condenser 16 through contacts 97 and 97a.

The operation takes place as explained in connection with the other embodiments of the apparatus described above. The rotating cam 95 which may be driven by an electrical meter, for example, the readings of which are to be totalized, alternately closes contacts 96 to charge the condenser 13 and opens the contact 96 simultaneously with closing the contact 97 in order to transfer the charge from the condenser 13 to the charge collecting condenser 16. In a similar manner each impulse given the cam 95a, for example, the rotation of the shaft of a meter, transfers a charge from the condenser 13a to the charge collecting condenser 16. When the condenser 16 has received a charge corresponding to the potential for which the discharge tube 39 is biased, the tube 39 becomes conducting. The discharge tube 39 may if desired be arranged when it becomes conducting to discharge the condenser 16 through a magnet coil 98 having a plunger 99 cooperating with a star-wheel 100 carried by the shaft of a registering device 101. Accordingly, each time, a predetermined total number of impulses is supplied to the apparatus the condenser 16 is discharged and the reading of the register 101 is advanced. Each of the condensers 13 and 13a and their associated charging and circuit controlling means may be situated at a distance from the condenser 16 and each other, and connected to condenser 16 by conductors of any desired length. The apparatus then affords a means for telemetering as well as totalizing.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination, a source of current, a grid controlled discharge tube and a pair of condensers connected in series, a second grid controlled discharge tube connected across one of said condensers, means responsive to the potential difference across the other of said condensers, and means for modifying the grid potentials of said discharge tubes alternately for the purpose of causing said tubes alternately to become conducting thereby alternately charging and discharging the first mentioned condenser and progressively charging the other of said condensers to successively higher potentials.

2. An impulse responsive device selectively responsive to a predetermined code of impulses comprising a source of current, a charge transferring condenser receiving charges therefrom, a grid controlled discharge tube controlling the charging of said condenser, a second grid controlled discharge tube controlling the discharging of said condenser, an intermediate condenser in circuit with said charge transferring condenser and receiving charges in accordance with the charge of said charge transferring condenser, means for modifying the grid potentials of said discharge tubes in succession in response to each impulse for the purpose of causing said tubes to become conducting successively, thereby alternately charging and discharging said charge transferring condenser and progressively charging said intermediate condenser to successively higher potentials with each impulse, a third grid controlled discharge tube arranged to discharge said intermediate condenser when more than a predetermined number of impulses is received, a charge collecting condenser and a resistor in series connected to said intermediate condenser, and means responsive to the potential of said charge collecting condenser.

3. An impulse responsive device, selectively responsive to a predetermined code of impulses comprising a source of current, a charge transferring condenser receiving charges therefrom, a grid controlled discharge tube controlling the charging of said condenser, a second grid controlled discharge tube controlling the discharging of said condenser, an intermediate condenser in circuit with said charge transferring condenser and receiving charges in accordance with charge of said charge transferring condenser, means for modifying the grid potential of said discharge tubes in succession in response to each impulse for the purpose of causing said tubes to become conducting successively, thereby charging and discharging said charge transferring condenser and progressively charging said intermediate condenser to successively higher potentials with each impulse, a charge collecting condenser and a resistor in series connected to said intermediate condenser, a third grid controlled discharge tube arranged to discharge said charge collecting condenser when the potential of said intermediate condenser exceeds that corresponding to a predetermined number of impulses, and means responsive to the potential of said charge collecting condenser.

4. An impulse responsive device selectively responsive to a predetermined code of impulses, comprising a source of current, a charge transferring condenser receiving charges therefrom, a grid controlled discharge tube controlling the charging of said condenser, a second grid controlled discharge tube controlling the discharging of said condenser, an intermediate condenser in circuit with said charge transferring condenser and receiving charges in accordance with the charge of said charge transferring condenser, means for modifying the grid potential of said discharge tubes in succession in response to each impulse for the purpose of causing said tubes to become conducting successively, thereby charging and discharging said charge transferring condenser and progressively charging said intermediate condenser to successively higher potentials with each impulse, a charge collecting condenser and a resistor in series connected to said intermediate condenser, a third grid controlled discharge tube arranged to discharge said charge collecting condenser when the potential of said intermediate condenser exceeds that corresponding to predetermined number of impulses, means responsive to the potential of said charge collecting condenser, a fourth normally conducting grid controlled discharge tube shunting said intermediate condenser, and means for causing said fourth discharge tube to become non-conducting during each impulse and for a period thereafter somewhat greater than a normal interval between impulses of the code.

5. An impulse responsive device selectively responsive to a predetermined code of impulses comprising a condenser, means for charging said condenser to successively higher potentials in response to successive impulses, a second condenser connected to said first mentioned condenser so as to be charged therefrom, a resistor included in the connection, means responsive to the potential of said second condenser, and means for short-circuiting said first mentioned condenser when more than a predetermined number of impulses is received.

6. An impulse responsive device selectively responsive to a predetermined code of impulses comprising a condenser, means for charging said condenser to successively higher potentials in response to successive impulses, a second condenser connected to said first mentioned condenser so as to be charged therefrom, a resistor included in the connection between said condensers, means for short-circuiting said second mentioned condenser when more than a predetermined number of impulses are supplied to the device, and means responsive to the potential of said second condenser.

7. An impulse responsive device selectively responsive to a predetermined code of impulses comprising a condenser, means for charging said condenser to successively higher potentials in response to successive impulses, a second condenser connected to said first mentioned condenser through resistance for the purpose of causing said second condenser to acquire the potential of the first condenser after a predetermined time delay, means responsive to the potential of said second condenser, and means for preventing a response when the interval between impulses exceeds a predetermined time.

8. In combination, a source of current, a series condenser and a charge collecting condenser receiving charges from said source in series, means controlling the charging of said condensers, and means controlling the discharging of said series condenser, said controlling means being arranged alternately to charge and discharge said series condenser and progressively to charge said charge collecting condenser to successively higher potentials.

9. In combination, a source of current, current interrupting means, a condenser, a second condenser of greater capacity all connected in series, a second current interrupting means connected across the terminals of said first mentioned condenser, means responsive to the potential difference across said second condenser, means for controlling said current interrupting means making them alternately conducting thereby alternately charging and discharging said first mentioned condenser and progressively charging the second of said condensers to successively higher potentials.

10. An impulse responsive device selectively responsive to a predetermined code of impulses comprising a condenser, means for charging said condenser to successively higher potentials in response to successive impulses, means responsive to the potential of said condenser, and impulse responsive means for preventing the operation of said potential responsive means in case the number of impulses supplied to the device exceeds a predetermined number.

11. An impulse responsive device selectively responsive to a predetermined code of impulses comprising in combination, a charge transferring condenser, a charge collecting condenser in circuit therewith, means for alternately charging and discharging said charge transferring condenser and charging said charge collecting condenser by an amount dependent upon the charge of the first condenser to successively higher potentials in response to successive impulses, means responsive to the potentials of said condenser, and impulse responsive means for preventing the operation of said potential responsive means in case the number of impulses supplied to the device exceeds a predetermined number.

12. In a condenser charging system, a storage condenser, a series condenser, a source of alternating current, a charging circuit for the condensers in series, a discharge circuit for the series condenser, and means responsive to each wave of alternating current of one polarity to cause current to flow in the charging circuit of the condensers, and responsive to each wave of current of the opposite polarity for causing said series condenser to discharge current over the discharge circuit.

13. Apparatus for investigating properties of electrical impulses comprising a condenser, a second condenser of greater capacity than said first condenser, means responsive to each impulse for charging said condensers in series, means also responsive to each impulse for discharging said first condenser, means for discharging said second condenser responsive to a predetermined charge accumualtion thereon, a measuring device, and means in the discharge circuit of said second condenser for controlling said device.

14. An impulse responsive device selectively responsive to a predetermined code of impulses comprising a condenser, means for charging said condenser to successively higher potentials in response to successive impulses, means responsive to the potential of said condenser, and a time responsive means reset by each impulse for preventing the operation of said potential responsive means in response to a predetermined delay before the reception of a succeeding impulse.

ALAN S. FITZ GERALD.

CERTIFICATE OF CORRECTION.

Patent No. 2,110,015. March 1, 1938.

ALAN S. FITZ GERALD.

It is hereby certified that error appears in the printed specification of the above numbered patent requiring correction as follows: Page 3, second column, line 51, after the word "current" insert to; page 4, second column, line 64, for "mode" read code; page 5, second column, line 58, claim 4, for "transferrng" read transferring; line 72, same claim, after "to" insert the article "a"; page 6, second column, line 25, claim 11, for "potentials" read potential; and that the said Letters Patent should be read with these corrections therein that the same may conform to the record of the case in the Patent Office.

Signed and sealed this 26th day of April, A. D. 1938.

(Seal)

Henry Van Arsdale,
Acting Commissioner of Patents